United States Patent

[11] 3,568,846

| [72] | Inventor | Albert J. Haefner |
| | | Baton Rouge, La. |
| [21] | Appl. No. | 725,168 |
| [22] | Filed | Apr. 29, 1968 |
| [45] | Patented | Mar. 9, 1971 |
| [73] | Assignee | Ethyl Corporation |
| | | New York, N.Y. |

[54] PLASTIC FILTER MEDIA
6 Claims, No Drawings

[52] U.S. Cl. .................................................. 210/506
[51] Int. Cl. .................................................. B01d 39/04
[50] Field of Search .................................. 210/500, 506

[56] References Cited

UNITED STATES PATENTS

| 2,101,961 | 12/1937 | Slidell | 210/290 |
| 3,424,674 | 5/1966 | Webber | 210/20 |
| 2,036,258 | 4/1936 | Cummins | 210/506X |
| 2,040,818 | 5/1936 | Badollet | 210/506 |
| 2,106,318 | 1/1938 | Elliott et al. | 210/506X |
| 2,398,284 | 4/1946 | Briggs | 210/500X |
| 2,448,337 | 8/1948 | Wickenden | 210/500X |
| 2,464,204 | 3/1949 | Baker | 210/506UX |
| 2,508,602 | 5/1950 | Goetz | 210/500X |
| 2,564,926 | 8/1951 | Rapier | 210/500X |
| 2,612,966 | 10/1952 | Nichol | 210/500X |
| 2,668,151 | 2/1954 | Pedlow, Jr. et al. | 210/506X |
| 3,327,859 | 6/1967 | Pall | 210/500UX |

FOREIGN PATENTS

| 133,784 | 8/1949 | Australia | 210/506 |

*Primary Examiner*—Samih N. Zaharna
*Attorneys*—Donald L. Johnson and David L. Ray

ABSTRACT: An improved filter media is prepared by subjecting particles of a plastic material having discrete, irregular, nonuniform shaped surfaces to treatment with a quantity of a surfactant or wetting agent sufficient to permit the plastic particles to be readily wetted by water.

PLASTIC FILTER MEDIA

BACKGROUND OF THE INVENTION

1. Field of the Invention

This invention relates to an improved filter media made from particles of plastic material that have been treated with a sufficient quantity of a surfactant to make the particles readily wettable.

2. Description of the Prior Art

It has recently been discovered that particles of plastic material having discrete, irregular, nonuniform shaped surfaces are surprisingly effective as filter media for the filtration of solids from liquid materials. In particular, polyvinyl chloride particles prepared by a suspension or emulsion polymerization technique have been found to possess an unusually high affinity for removal of solid materials from aqueous streams. Process and apparatus utilizing discrete plastic filter media is found in copending patent application Ser. No. 716,908, filed Mar. 28, 1968, which application is assigned to the assignee of the present application. While particles of plastic formed by conventional polymerization processes have been found to be suitable for preparing filters as described in the aforementioned patent application, difficulty has been encountered in wetting out the plastic particles when they are first used or after they have dried out when there is no liquid flow. Because some of the plastic particles have a tendency to float and to agglomerate losses are incurred in backwashing filters where gravity flow type filtration techniques are used.

Therefore there is a recognized need for more suitable plastic filter particles which are readily wetted out by aqueous media to avoid the loss on backwashing.

SUMMARY OF THE INVENTION

It is an object of the present invention to provide an improved filter media of particulate plastic particles that are readily wetted by water.

It is a further object of the present invention to provide an improved filter media of particulate plastic particles that have been treated prior to use to resist flotation.

The foregoing and other objects are realized in an improved filter media which includes particles of a plastic material having discrete, irregular, nonuniform shaped surfaces. The plastic material is treated with a sufficient quantity of surfactant or wetting agent to permit the particles to be readily wetted by water.

The improved filter media has been found to be readily wetted by water and no agglomeration of dry particles is evidenced when water is added to the filter media for the first time. Additionally, the improved filter media having a surfactant treatment has been found to be readily rewetted by water even after the filter bed has been allowed to dry.

DESCRIPTION OF THE PREFERRED EMBODIMENTS

Discrete particles of plastic material having irregular, nonuniform shaped surfaces such as polyvinyl chloride particles prepared by bulk, suspension, or emulsion polymerization are particularly adapted for use in filtering solids from liquid streams. As pointed out hereinbefore one problem experienced with these plastic filter particles has been their tendency to agglomerate and to float on the surface of aqueous streams when used for the first time as filter media. It has been found that if the filter media previously treated with a surfactant the particles are readily wetted by the aqueous media when they are used as filtering media.

The plastic particles for filter media may be treated by adding a small percentage of a wetting agent such as a surface active agent or surfactant or detergent to the particles prior to use as a filter media. In general the detergent or surfactant or wetting agent can be of any of the more common type of agents available such as anionic, cationic, nonionic surfactants or combinations of any of the foregoing. It has been found that the wetting agents or surfactants are most effective when used in a range of from about 0.001 percent to about 1.0 percent based on the total weight of the plastic particles to be treated. A more preferred range for the surfactant or wetting agent is from about 0.01 percent to about 0.2 percent weight surfactant or wetting agent. The wetting agent may be applied to the polyvinyl chloride filter media in a number of ways. The surfactant can be dissolved in an aqueous media and the aqueous media can be sprayed on the plastic particles as they are aerated or mixed in order to provide a uniform dampening of all the surface area of each of the particles. Another method of applying the surfactant or wetting agent is to dissolve the wetting agent in a sufficient quantity of water to immerse the plastic filter media in and to soak the filter media in the detergent or surfactant solution. This is one of the more preferred ways of applying the surfactant to the plastic filter media. After soaking for a reasonable time (1 hour to 10 hours) the liquid surfactant solution is drained from the plastic particles and they can be dried and boxed for shipment or the particles may be used immediately thereafter while still wet as a filter media. If desired the surfactants or wetting agents may be applied in the form of dry powders and thoroughly blended into or dusted onto the plastic particles to evenly coat and adhere to the surfaces of the plastic particles. In order to achieve the proper dilution rates inert additives may be added to the surfactants to achieve proper dispersion onto the plastic particles.

Surfactants that may be effectively used in preparing the improved filter media are any of a number of common types including soaps, detergents, formulated detergent compositions including builders and sudsing agents, inert diluents, etc.

Among the wetting agents which are eminently suitable are soaps such as fatty acid salts of some of the alkali metals such as potassium or sodium with long chain fatty acids. Commercially available soaps made from mixed fatty acids containing about 80 percent tallow fatty acids and about 20 percent coconut oil fatty acids are quite suitable. Such soaps may contain sodium or potassium salts of lauric acid and steric acid together with olic and other 12 to 22 carbon atom fatty acids.

Suitable examples of anionic organic nonsoap detergent surfactants are alkyl glyceryl ether sulfonates, alkyl sulfates alkyl monoglyceride sulfates and sulphonates, alkylpolyethenoxy ether sulfates alkylbenzene sulfonates wherein the alkyl substituent is straight chain or branched chain, e.g., dodecylbenzene sulfonates, sulfonated alphaolefins and alkylphenol polyethenoxy sulfonates. The foregoing are preferably used in the water soluble salt form such as the sodium, potassium, ammonium or alkylolammonium salts, for example, sodium lauryl sulfate, potassium N-methyl-N-lauroyl tauride, and triethanolammonium dodecylbenzene sulfonate. Examples of nonionic organic detergents or surfactants are polyethylene oxide condensates of alkylphenols wherein the alkyl groups contain from 8 to about 15 carbon atoms (e.g., t-octylphenol). Also condensation of products of ethylene oxide with straight or branched aliphatic alcohols containing from 8 to 18 carbon atoms, e.g., lauryl alcohol.

The detergent or surfactant composition can be a commercially available composition which includes a detergent together with builders, foam depressants, etc. Examples of suitable builder salts which may be included in a detergent composition includes the alkali metal carbonates, phosphates, pyrophosphates, polyphosphates and silicates such as sodium tripolyphosphate, and sodium carbonate.

The plastic material chosen for the filter media may be any plastic material, synthethic or natural, which has the requisite physical properties for the service in which the filter is utilized. The plastic filter media may be selected from thermoplastics and thermosetting plastics. Examples of suitable plastic materials are polyolefins, polyvinyl halides, polyacrylates, polyacrylonitriles, polyamides, polycarbonates, polyesters, polyoxymethylenes, polymethacrylates, polystyrenes, polyurethanes, melamine-formaldehyde resins, phenol-formaldehyde resins and urea-formaldehyde resins.

Additionally other plastic materials may be utilized for this service. Examples of suitable polyolefins are polyethylene, chlorinated polyethylene, polypropylene, polybutenes, and poly 4-methyl pentene-1. Examples of suitable polyvinyl halides are polyvinyl fluoride, polyvinyl chloride, polyvinyl bromide, polyvinylidene chloride, polytetrafluoroethylene, and polychlorotrifluoroethylene. Examples of suitable polyacrylates are polymethyl acrylate, polyethyl acrylate, polymethyl methacrylate, polyallyl methacrylate, polycyclohexyl methacrylate. Examples of suitable polyamides are nylon 66 (hexamethylenediamine:adipic acid polymer), nylon 610 (hexamethylenediamine:sebacic acid polymer), nylon 6 (caprolactam polymer), and nylon 11 (amino undecanoic acid polymer). An example of a suitable polycarbonate is the bisphenol A:phosgene polymer (Lexan). Examples of suitable polyesters are terephthalic acid:ethylene glycol polymer and ethylene glycol:phthalic anhydride:styrene terpolymer. Examples of suitable polyoxymethylenes are polyformaldehyde, trioxane polymers, vinyl ether:trioxane copolymer and norbornylene:trioxane copolymer. Examples of suitable polystyrenes are polystyrene, polychlorostyrene, polyvinyl styrene, polybromo styrene. Examples of suitable polyurethanes are toluene diisocyanate:tetramethylene glycol polymer, and hexamethylene diisocyanate:tetramethylene glycol polymer. Examples of suitable thermosetting plastics are the melamine-formaldehyde resins, phenol-formaldehyde resins, and urea-formaldehyde resins.

EXAMPLE I

When a quantity of polyvinyl chloride (Ethyl SR 225 PVC resins made by a suspension process) was placed in a container approximately 50 percent of the resin floated on top of the water either as individual particles or agglomerates. A solution of 0.01 percent sodium lauryl sulfate in water was prepared and the same quantity of the same lot of polyvinyl chloride resin was added to this solution with stirring. The resin particles were quickly wetted out and sank to the bottom of the container after stirring ceased. After dewatering the treated resin was placed in a closed filter tank and upon introduction of turbid water immediately wetted out and settled into a uniform bed in the lower portion of the tank. On backwashing the individual particles were cleanly separated and no tendency to agglomerate or to float to the top of the water was evidenced.

EXAMPLE II 100 grams of the same polyvinyl chloride resin used in example I was placed in a large beaker. To that beaker was added 1 cc. of a 2 percent solution of sodium lauryl sulfate by spraying over the resin as the resin was agitated. 200 grams of water was added to the beaker containing the treated resin particles with vigorous stirring. When the stirring was stopped all the resin particles quickly settled to the bottom of the beaker.

In addition to the anionic soaps and detergents the cationic soaps are also suitable wetting agents for use in this invention. Particularly suitable are the quaternary ammonium compounds in which the aliphatic radical can be straight chain or branched chain and containing from about 8 to about 18 carbon atoms, e.g., myristamido propyl dimethyl benzyl ammonium chloride. One of the preferred detergent surfactant materials is sodium dioctyl sulfosuccinate.

The particle size of the plastic particles most suited for use as filter media should be between about 10 mesh to about 60 mesh.

While there has been described what is at present considered preferred embodiments of the present invention, it will be apparent to those skilled in the art that various modifications and changes may be made without departing from the essence of the invention. It is intended to cover herein all such modifications and changes as come within the true scope and spirit of the claims.

I claim:
1. Filter media comprising particles of polyvinyl chloride having discrete, irregular, nonuniform-shaped surfaces in a particle size from about 10 mesh to about 60 mesh, said particles having been treated with a sufficient quantity of a surfactant to permit said particles to be readily wetted by water, and said particles having a specific density greater than the specific density of water.

2. Filter media as defined in claim 1 wherein said polyvinyl chloride is produced by either emulsion, bulk, or suspension polymerization process.

3. Filter media as defined in claim 1 wherein the surfactant is selected from the group consisting of cationic, anionic, and nonionic surfactants.

4. Filter media as defined in claim 1 wherein the surfactant is sodium lauryl sulfate.

5. Filter media as defined in claim 1 wherein the surfactant is sodium dioctyl sulfosuccinate.

6. Filter media as defined in claim 1 wherein said polyvinyl chloride particles are treated with the surfactant in a concentration of from about 0.001 percent to about 1.0 percent weight based on the weight of said particles.